(12) United States Patent
Ernst

(10) Patent No.: US 10,500,712 B2
(45) Date of Patent: Dec. 10, 2019

(54) TOOL STORAGE RACK

(71) Applicant: Gregory R Ernst, Eagle Creek, OR (US)

(72) Inventor: Gregory R Ernst, Eagle Creek, OR (US)

( * ) Notice: Subject to any disclaimer, the term of this patent is extended or adjusted under 35 U.S.C. 154(b) by 0 days.

(21) Appl. No.: 15/379,489

(22) Filed: Dec. 15, 2016

(65) Prior Publication Data
US 2017/0173776 A1 Jun. 22, 2017

Related U.S. Application Data

(60) Provisional application No. 62/269,040, filed on Dec. 17, 2015.

(51) Int. Cl.
| | | |
|---|---|---|
| B25B 1/00 | (2006.01) | |
| B25H 3/04 | (2006.01) | |
| B23Q 3/00 | (2006.01) | |

(52) U.S. Cl.
CPC ...... *B25H 3/04* (2013.01); *B23Q 3/00* (2013.01)

(58) Field of Classification Search
USPC .................. 269/16; 206/372, 376, 561
See application file for complete search history.

(56) References Cited

U.S. PATENT DOCUMENTS

| | | | | |
|---|---|---|---|---|
| 2,686,675 A * | 8/1954 | Shedd | ............... | A63F 1/12 |
| | | | | 211/50 |
| 3,338,421 A * | 8/1967 | Lyman | ............... | A47B 81/007 |
| | | | | 211/41.12 |
| 4,129,213 A * | 12/1978 | Fleig | ............... | A45C 11/00 |
| | | | | 190/11 |
| 4,684,027 A * | 8/1987 | Wright | ............... | G11B 23/027 |
| | | | | 211/40 |
| 6,059,108 A * | 5/2000 | Schiltz, Jr. | ............... | B25H 3/06 |
| | | | | 206/373 |
| 2004/0256336 A1 * | 12/2004 | Ling | ............... | A47F 7/00 |
| | | | | 211/70.6 |
| 2013/0069354 A1 * | 3/2013 | Pecora | ............... | B60R 9/06 |
| | | | | 280/769 |

* cited by examiner

*Primary Examiner* — Joseph J Hail
*Assistant Examiner* — Shantese L McDonald
(74) *Attorney, Agent, or Firm* — patenttm.us

(57) ABSTRACT

A tool storage rack provides receiving bays for positioning tools therein. An elastomeric portion of the rack provides gripping and cushioning for the tool and further provides gripping for lessening the chance of movement or sliding of the rack from position.

19 Claims, 6 Drawing Sheets

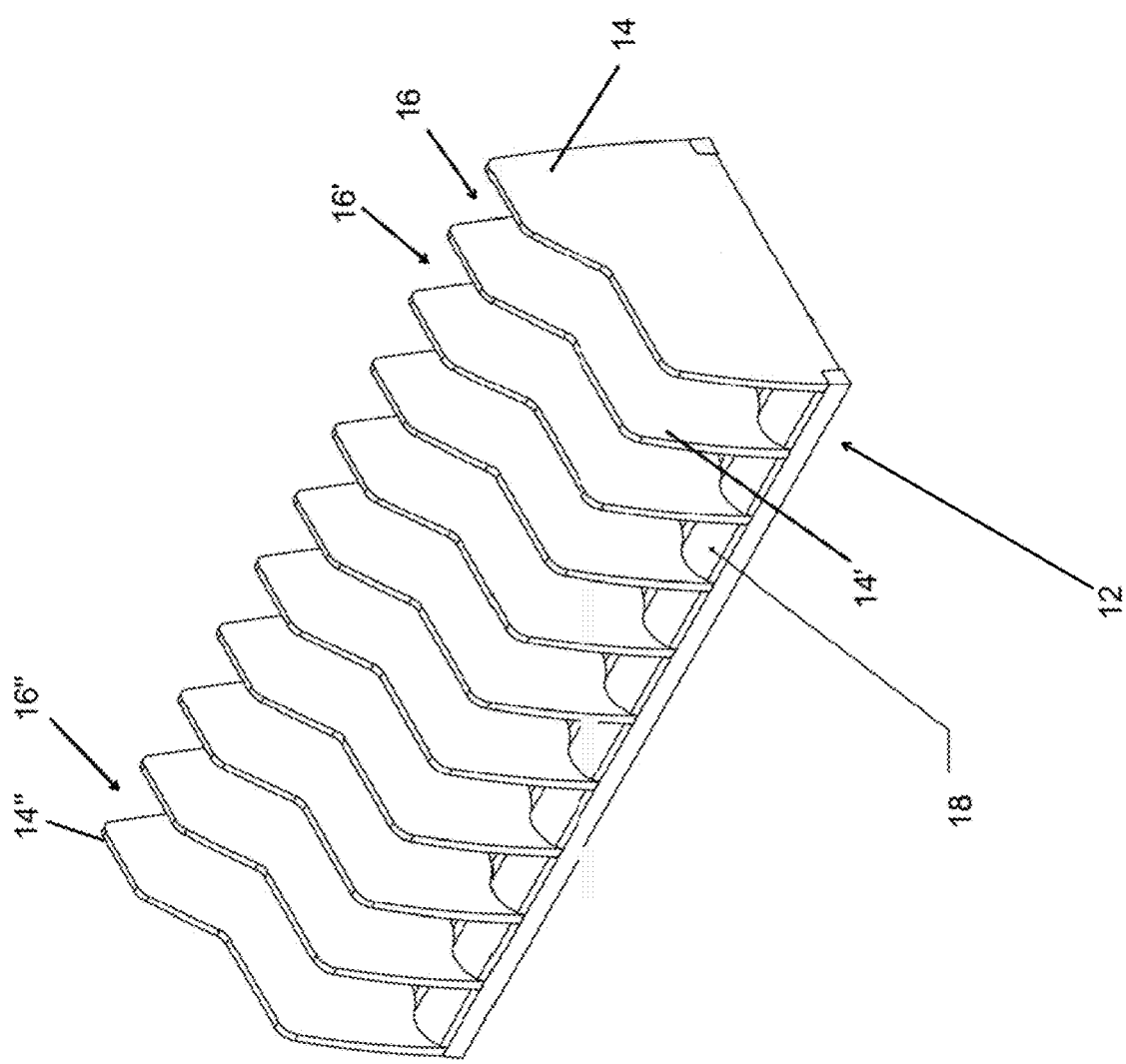

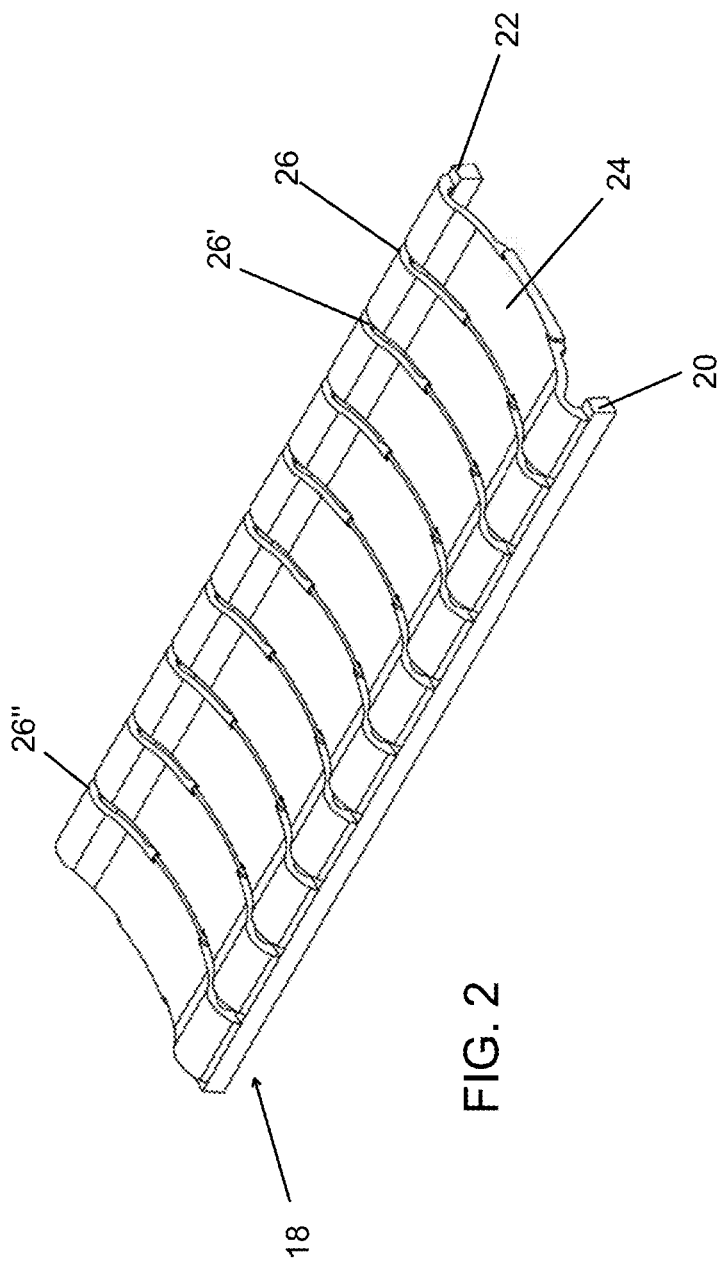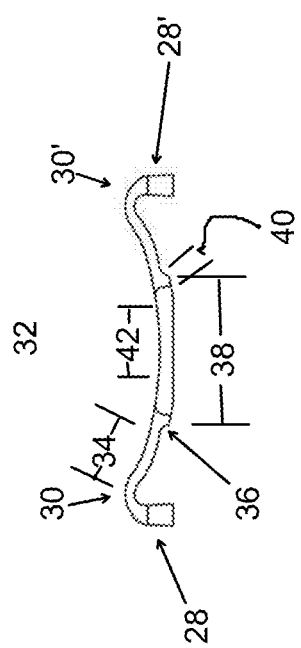

TOOL STORAGE RACK

CROSS-REFERENCE TO RELATED APPLICATIONS

This application claims benefit of U.S. provisional patent application Ser. 62/269,040 filed Dec. 17, 2015, the disclosure of which is incorporated herein by reference.

BACKGROUND

This disclosure relates to tools and more particularly to a rack for assisting in the storage of tools such as hand tools.

Hand tools are often kept in tool boxes or tool drawers for storage when not being used. As the number of tools a user has increases, keeping the tools organized becomes more of a challenge. Simply throwing the tools into the drawer or box quickly becomes problematic as the user has to dig through a pile of tools to find a particular tool of interest as the number of tools gets larger. Also, with the tools placed in haphazard fashion, it becomes harder to recognize whether a tool is present in the box or drawer. A user might not realize that a tool has not been returned to the box or drawer, when a disorganized pile of tools is present.

SUMMARY

In accordance with the disclosure, a tool storage rack provides spaced receiving bays for holding tools. An elastomeric base provides a cushioned grip to the tools and to grip to hold the rack in position in the tool drawer/box.

Accordingly, it is an advantage of the present disclosure to provide an improved tool storage rack.

It is a further advantage of the present disclosure to provide an improved tool storage rack that organizes hand tools in a tool drawer or box.

It is yet another advantage of the present disclosure to provide an improved rack for storing pliers and the like in a tool box or tool drawer.

The subject matter of the present device is particularly pointed out and distinctly claimed in the concluding portion of this specification. However, both the organization and method of operation, together with further advantages and embodiments thereof, may best be understood by reference to the following description taken in connection with accompanying drawings wherein like reference characters refer to like elements.

BRIEF DESCRIPTION OF THE DRAWINGS

FIG. 1 is a perspective view of a tool storage rack in accordance with the disclosure;

FIG. 2 is a perspective view of the elastomeric liner shown removed from engagement with the base member;

FIG. 3, an end view of the elastomeric liner removed from the base member

DETAILED DESCRIPTION

Figure 4:
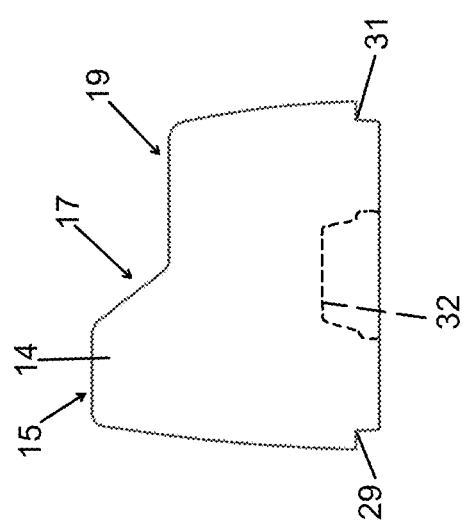
FIG. 4 is an end view of the base portion without the elastomeric liner installed.

The system according to a preferred embodiment of the present disclosure comprises a rack member with plural storage positions and an elastomeric liner providing cushioning and anti-skid properties to the tool storage rack.

Referring to FIG. 1, a perspective view of a tool storage rack 10, the rack comprises a base member 12 having plural vertically extending dividers 14, 14', etc., which have walls that define tool receiving bays 16, 16', etc. The dividers have a larger vertical height relative to the bottom of the base member at rear portions 15 thereof, and then via an angled transition region 17 move to a lower height portion 19 toward the front thereof. The base member is suitably made of a plastic in a preferred embodiment. Mounted to the base member at the lower portion thereof is an elastomeric liner member 18, shown in perspective in FIG. 2, suitably made of rubber, engaged to the base member in a fitting arrangement. The liner member 18 defines a floor to the tool storage rack and provides a cushioned resting surface against which stored tools can rest. The front and rear faces of the liner comprise rectangular parallelepipeds 20, 22 extending substantially the length of the liner, with web-like portions 24 extending between the parallelepipeds. The length of the parallelepipeds is such that then ends thereof extend slightly beyond the outermost edges of the outermost web-like portions 24, 24' at opposite ends of the elastomeric liner. Transverse slots 26, 26', etc. extend across the web-like portions 24 from the front parallelepiped to the rear parallelepiped, spaced apart from one another substantially the same distance as the spacing of the dividers 14.

Referring to FIG. 3, an end view of the elastomeric liner removed from the base member, a face of the parallelepiped 20 define2 a vertical exterior wall portion 28, that transitions to a horizontal direction via a curved portion 30, continuing as a gentle concave up curved center web region 32, extending to the other side of the liner to curve down 30' to the vertical edge 28' of the other parallelepiped 22. In the central portion of web is a thicker region of the web that transitions as a concave down bottom face curve 36 from the thinner outer portion 34 to a thicker central portion 38. The outermost portion 40 of the central web portion 38 is slightly thicker than the centermost portion 42, with the bottom profile of the centermost portion defining a slight concave down curve.

Referring now to FIG. 4, an end view of the base portion without the elastomeric liner installed, the profile of a given vertically extending divider 14 is such that a right angle notch portion 29, 31 is defined at the lower most portion of the left and right edges of the divider. The profile of the notch portion substantially matches the cross section profile of parallelepipeds 20 and 22, such that when the elastomeric liner is installed in the base portion, top and inner face portions of the parallelepipeds and the notch portions 28, 30 mate to provide a secure nesting engagement between the elastomeric liner and the base portion at the positions of the vertically extending dividers. The vertical height of the parallelepipeds is slightly larger than the vertical height defined by the notch portion, so that the bottoms of the parallelepipeds protrude slightly to provide grip on a work surface. The parallelepipeds accordingly act as both part of a locking member to secure the liner and the base together and as feet members for contacting the work surface. An optional cut-out portion 32 may be provided in a central portion of the divider, suitably the non-edge dividers 14' being so configured.

Figure 5:
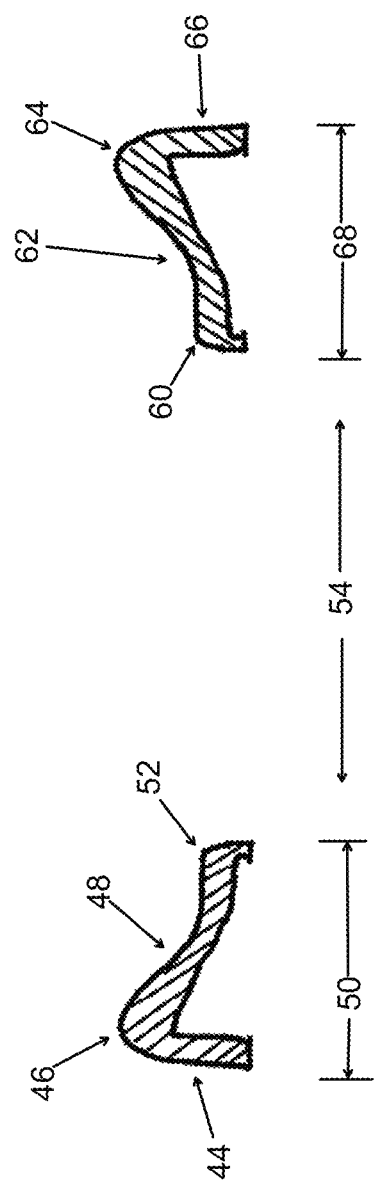
FIG. 5 is a cross sectional view of the base portion 12 taken along line 5-5 of FIG. 6.

Referring now to FIG. 5, a cross sectional view of the base portion 12 taken along line 5-5 of FIG. 13, a position between adjacent ones of the vertically extending dividers 14, the profile of the base portion in this region is described. The base has a substantially vertical wall portion 44 which transitions via a concave down curved portion 46 to a concave up profile 48 that transitions down via concave down curved profile 52, defining a region of width 50 from edge to edge. An open gap portion 54 is provided, transitioning to a concave down curved portion 60, leading to concave up region 62 extending up to concave down curved portion 64 which ends in vertical wall portion 66, with an edge to edge width 68. The widths of 50 and 68 are suitably substantially equal, while with width 54 is suitably twice of width 50 or 68, in a particular embodiment.

Figure 6:
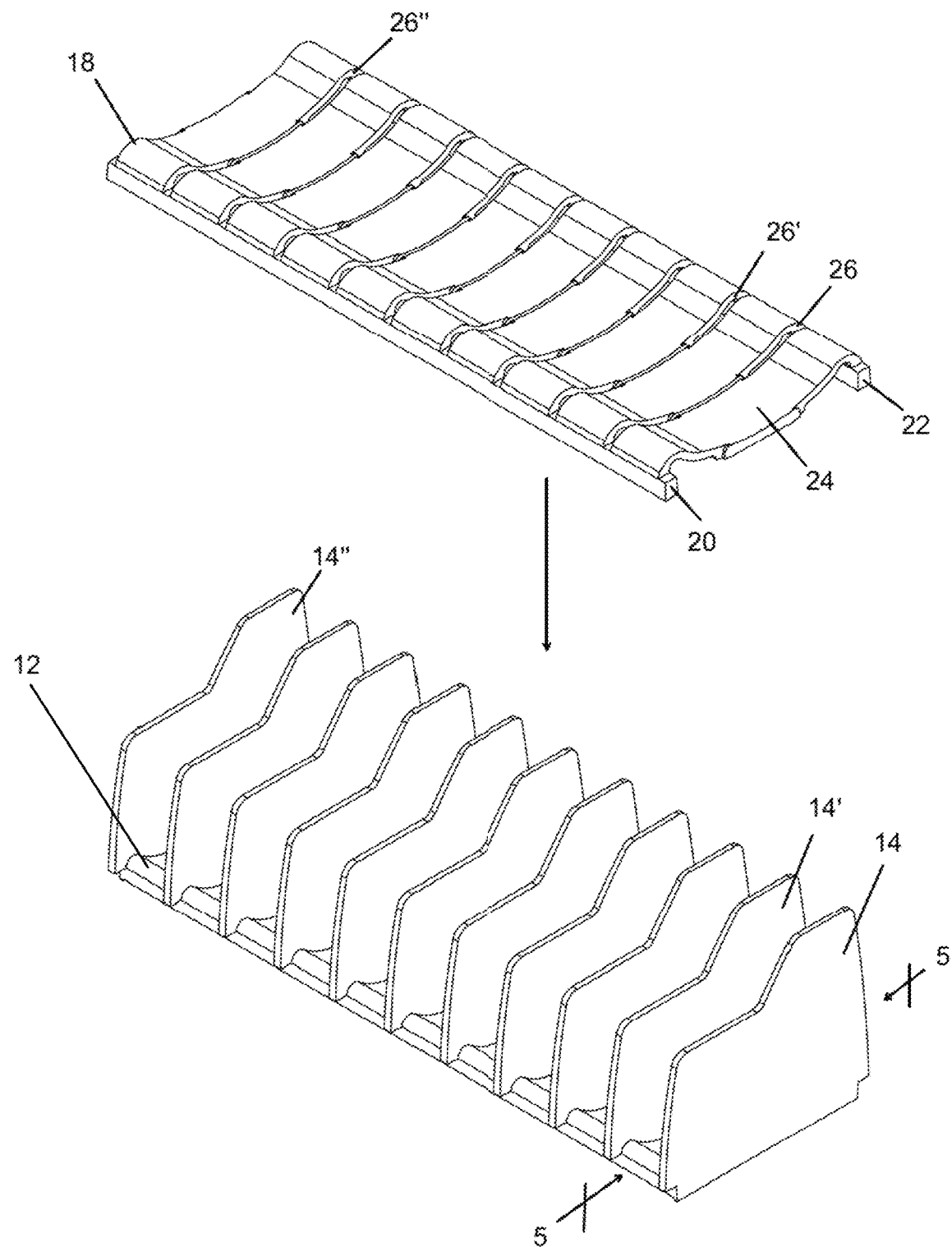
FIG. 6 is a perspective view of the assembly of the elastomeric tool base portion with the main body portion of the tool storage rack.

FIG. 6, a perspective view of the assembly of the elastomeric tool base portion with the main body portion of the tool storage rack, illustrates that the elastomeric liner may be provided separately from the base portion, and the storage rack is assembled by lowering the elastomeric base over the top of the base 12, passing the divider members 14, 14', etc. through the slots 26, 26', etc.

Once the elastomeric liner is lowered into position on the base member, the substantially rectangular shaped portions of the parallelepipeds seat within the notches 28, 30 defined in the base portion, to secure the engagement between the liner and base. Further, the profile of the liner aligns with the profile of the base such that concave down curve 36 of the liner seats with the concave down curved profile 52 of the base (and the corresponding other side of the liner seats with concave down curved portion 60.

Figure 7:
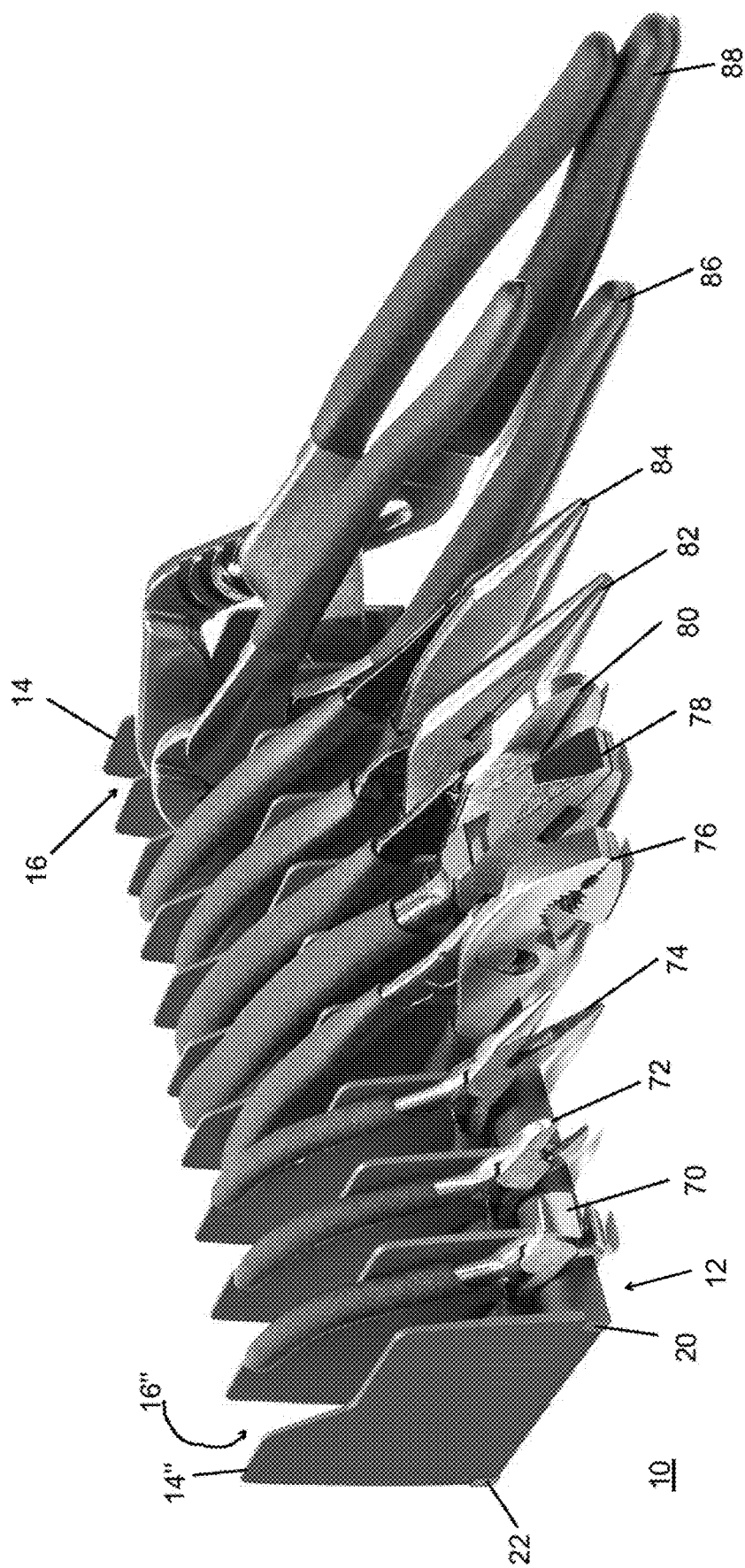
FIG. 7 is a perspective view of a tool storage rack having 10 tool receiving bays with various types of pliers stored therein.

The tool storage rack of the present disclosure is useful, for example, as an organizer for pliers. Referring to FIG. 7, a view of a tool storage rack having 10 tool receiving bays, various types of pliers may be stored in the rack for easy access and organization. Some of the pliers, end cutting pliers 70, diagonal cutting pliers 72, needle nose pliers 74, slip-joint pliers 76, linesman pliers 78, larger diagonal cutter 80, larger needle nose pliers 82 and 84, are stored by placing the handle portion of the pliers between a set of adjacent dividers 14. Other pliers, utility pliers 86 and 88, are larger, or have different handle configurations, and are instead put into the rack by placing the pliers head portion into the receiving bays defined by adjacent dividers 14. The lower height front portion 19 of the rack allows easier access to the handles of the smaller tools, while the higher rear portions 15 provide additional support to the handles or tool head of larger tools placed in the rack, such that larger tools are not inclined to tip over into adjacent tool bays.

The vertical dividers maintain the pliers separate from one another, reducing tangling, while the elastomeric liner helps to provide a frictional gripping function so that the pliers are less likely to unintentionally slide out of the rack. A typical user might position the rack within a tool drawer, and place the pliers in the rack. The organized placement maximizes storage by organizing the pliers upright in the toolbox drawer, unentangled with other tools. The elastomeric liner of the base grips the tools and the drawer to keep it all in place. Further, the elastomeric nature of the liner reduces the noise produced when putting a tool into the rack. The rack can accommodate a wide variety of tools. The user can, for example immediately recognize if any tools are missing by a quick glance at the tool rack. The plastic/elastomeric materials that the rack is constructed from provide fuel and solvent resistance so that the rack is not damaged when used in environments with exposure to such. Suitable dimensions in a particular embodiment are 10 inch overall length, 3.75 inch height, and 3 inch depth, although other sizes may be employed to accommodate different tool sizes.

While a preferred embodiment of the technology has been shown and described, it will be apparent to those skilled in the art that many changes and modifications may be made without departing from the broader aspects. The appended claims are therefore intended to cover all such changes and modifications as fall within the true spirit and scope of the technology.

What is claimed is:

1. A tool storage rack, comprising:
   a base member having first and second end walls and plural spaced walls between said end walls extending perpendicularly away from said base member, defining plural tool receiving bays between said first end wall and an adjacent one of said plural spaced walls and between successive adjacent ones of said plural spaced walls and between a last one of said plural spaced walls and said second end wall, a first portion of at least one tool receiving bay defining a concave up section adjacent a first edge of the base member; and
   an anti-skid liner positionable on said base member for defining a tool resting floor to the tool storage rack, wherein said anti-skid liner comprises an engagement member for engaging with said base member to secure the liner in position relative to said base member, said engagement member further defining feet portions for providing a portion to rest the tool storage rack against a surface.

2. The tool storage rack according to claim 1, wherein said feet portions provide gripping to resist against movement of the tool storage rack relative to the surface.

3. The tool storage rack according to claim 1, wherein said anti-skid liner provides gripping engagement with portions of a tool positioned in a tool receiving bay.

4. The tool storage rack according to claim 1, wherein said anti-skid liner and said base member have complementary profiles on portions thereof to provide for nesting engagement of said anti-skid liner with said base member.

5. The tool storage rack according to claim ones 1, wherein a section of at least one of said walls extends a first distance from said base member and defines a handle access region for smaller tools whereby access to a tool handle is not blocked by said wall.

6. The tool storage rack according to claim 1, wherein said tool receiving bays define a handle or tool head support region for larger tools.

7. The tool storage rack according to claim 1, further comprising a second portion of the at least one tool receiving bay defining a concave up section adjacent a second edge of the base member, said second edge being on a side of the base member opposite the first edge, said second portion concave up section providing a resting portion for engaging a portion of a tool having a curved profile positioned in the at least one tool bay.

8. The tool storage rack according to claim 1, further comprising said anti-skid liner having plural slots defined therein for passing over said plural spaced walls, for enabling positioning said anti-skid liner relative to said base member.

9. The tool storage rack according to claim 1, wherein said anti-skid liner comprises an elastomeric substance.

10. A method of providing a device for storing tools, comprising:
    providing plural tool receiving bays, ones of said tool receiving bays defined by a space between plural divider walls, first portions of said divider walls having a first height and second portions of said divider walls having a second height greater than said first height; and providing an anti-skid liner with receiving slots for allowing said divider walls to pass therethrough for allowing positioning of said anti-skid liner over said divider walls for positioning at a base of said tool receiving bays, further comprising providing said anti-skid liner with an engagement member for engaging with said tool receiving bays to secure the liner in position relative to said tool receiving bays, wherein portions of said engagement members further extend beyond perhipheral edges of said tool receiving bays and provide feet portions extending below a bottom surface of said tool receiving bays for providing a portion to rest the device against a surface.

11. The method according to claim 10, wherein said feet portions provide gripping to resist against movement of the receiving bays relative to a surface.

12. The method according to claim 10, wherein said anti-skid liner provides gripping engagement with portions of a tool positioned in a tool receiving bay.

13. The method according to claim 10, further comprising said first height first portions providing said tool receiving bays with a handle access region for smaller tools.

14. The method according to claim 10, further comprising said second height second portions providing said tool receiving bays with a handle or tool head support region for larger tools.

15. The method according to claim 10, wherein said anti-skid liner comprises an elastomeric substance.

16. A rack for holding pliers in a tool box or tool drawer, comprising:

plural divider members defining pliers receiving bays with opposite first and second edge portions, ones of said first and second edge portions having curved floor regions;

a first section of ones of said divider members extending a first distance from said floor regions and a second section of ones of said divider members extending a second distance from said floor regions, said second distance being greater than said first distance;

providing an anti-skid surface to said receiving bays for engagement with pliers placed in the rack, said anti-skid surface comprising a unitary member with slots defined therein for allowing installation over said divider members; and providing a gripping foot portion to the rack for gripping engagement with a surface, said gripping foot portion formed as a portion of the anti-skid surface that extends beyond peripheral edges of said receiving bays.

17. The rack according to claim 16, wherein said anti-skid liner comprises an elastomeric substance.

18. A method of providing a device for storing tools, comprising:

providing plural tool receiving bays defined by divider walls, first portions of said divider walls having a first height and second portions of said divider walls having a second height greater than said first height; and providing an anti-skid liner with receiving slots for allowing said divider walls to pass therethrough for allowing positioning of said anti-skid liner over said divider walls for positioning at a base of said tool receiving bays, further comprising providing said anti-skid liner with feet portions for providing a portion to rest the device against a surface, wherein said feet portions comprise rectangular parallelepipeds defined at opposite edges of the anti-skid liner and positioned adjacent to exterior peripheral edges of said tool receiving bays.

19. The method according to claim 18, wherein said anti-skid liner comprises an elastomeric substance.

* * * * *